Patented Mar. 14, 1933

1,901,441

UNITED STATES PATENT OFFICE

STEFAN FRÄNKEL, OF BERLIN, GERMANY

PROCESS OF MAKING PHOTOGRAPHIC SILVER SALT EMULSIONS

No Drawing. Application filed July 8, 1931, Serial No. 549,577, and in Germany October 17, 1930.

The present invention relates to a process of forming silver salt emulsion for photographic purposes and more particularly to the formation of what are known as "dull emulsions".

Heretofore photographic silver salt emulsions have been prepared by mixing a silver salt solution, preferably a solution of silver nitrate, with the solution of one or of several alkali halides in the presence of an organic colloid with or without the addition of other substances. The emulsions thus formed were thereupon subjected to suitable subsequent treatments such as ageing, washing out the alkali nitrate formed, addition of other substances, etc. To make dull emulsions it was necessary to add to the emulsion of silver halide a clouding agent.

The object of my present invention is to provide a method whereby dull photographic silver salt emulsions may be formed directly in a single operation or without the necessity of adding a clouding agent subsequent to the formation of the colloid.

Further objects of the invention are to provide a process of making clouded or dull emulsions having a high degree of dispersion of the clouding agent precipitated in the emulsion itself and thus to provide a permanently uniform distribution of the clouding agent in the emulsion and also to make by means of the clouding agent an improvement in the photographic properties of the silver halide as for example, with regard for its granular size and structure. A further object of the invention is to provide a clouded emulsion having a greater diffused light reflection than used for paper pictures.

In the present invention photographic silver salt emulsions are formed by the use of suitable reagents which, in addition to forming the silver halide, also form, as a second reaction product, a precipitate of an insoluble or only slightly soluble compound. For example, a solution of a silver salt, such as the sulfate or fluoride or other salt whose anions form insoluble or but slightly soluble compounds with certain cations is mixed with a halide salt such as a barium halide whose cations form an insoluble compound with the anions of the silver compound. As the two solutions are mixed there is formed not only a precipitate of a silver halide, but also a precipitate of barium sulfate or barium fluoride or other salt formed by the anions of the original silver reagents or the cations of the halogen reagent. In the case in which barium sulfate is thus produced it occurs in the form of a finely crystalline precipitate. There is thus obtained in this manner an emulsion, which after the removal of the silver halide is uniformly dull or clouded due to the finely dispersed barium sulfate or equivalent compound and thus forms a dull emulsion.

When silver sulfate is used for the making of the emulsion, inasmuch as it is only slightly soluble in pure water, it must be placed in solution by means of ammonia, which during the reaction with the barium halide solution is again released. The ammonia thus freed can be neutralized immediately upon the formation of the emulsion by adding to the solution an equivalent of halogen hydracid. The neutralizing can also be effected after the mixing of the two reagents and the resulting ammonium halide may be washed out prior to the pouring of the emulsion, or the ammonia may be washed out prior to the pouring of the emulsion without being neutralized or in some cases may remain in the emulsion. However, in any case, the quantity of the reacting barium halide should be at least equivalent to the quantity of the silver sulfate. A further treatment of the emulsion by ageing, sensibilizing, hardening, etc., can be done in the customary manner.

The above described method for the making of the emulsion can also be combined with other methods of making photographic silver salt emulsions, for example, with the methods commonly used for this purpose. Thus, solutions of reagents or starting material which contain similar or related ions may be mixed with a silver sulfate or the barium halide. For example, a solution of silver nitrate and silver sulfate and a solution containing a barium halide and one or more alkali halides may be employed. The mixture may also be made after the separate preparation of the individual emulsions. However, in any event, the quantity of reacting barium halide must be at least equivalent to the quantity of silver sulfate. The following is an example of the process.

Five grams of finely pulverized silver sulfate are suspended in 40 cubic centimeters of distilled water and just enough ammonia is added to obtain a clear solution. Seven grams of barium bromide and six grams of emulsion gelatin are dissolved in 100 cubic centimeters of distilled water. To this solution, at a temperature of about 35° C., a silver sulfate solution is added in small portions with constant stirring. The temperature of the mixture is maintained at about 40° C. for one half hour. Finally seven grams of emulsion gelatin are added and when completely dissolved the solution is permitted to cool. The cooled emulsion is then reduced to small pieces and washed and may then be poured in the usual manner.

In place of using silver sulfate a solution of silver fluoride may be employed. This has the advantage that the use of ammonia and the consequent neutralizing and washing of the ammonia may be avoided, inasmuch as no addition of ammonia is necessary for the solution of the silver fluoride. Moreover, when using equivalent quantities or in case of a slight excess of a halide the emulsion does not contain any disturbing soluble substances.

In addition to rendering the process simpler and more effective my present invention also has the advantage of producing an emulsion having a high degree of dispersion of barium sulfate and a uniform distribution of the dispersion and also one in which the photographic properties of the silver halide are improved, as for example, with regard to its granular size or structure. Plates or films provided with such a dull emulsion can be used for transparent pictures, whether of the usual still type or for moving pictures. Furthermore, they are suitable for all such cases where an optional observation of a picture by reflection or as a transparency is desired, as for example, in the case of medical X-ray pictures. When used for pictures on paper, emulsion produced by my invention is advantageous on account of the increase of the diffused light reflection due to the distribution of the insoluble product.

What I claim is:

1. A process for making emulsions of the type described which comprises mixing, in the presence of a colloid, a silver salt and a halogen salt that forms insoluble salts with silver, said silver salt and said reacting halogen salt containing anions and cations respectively that form an insoluble precipitate during said reaction.

2. A process of forming silver salt emulsions of the type described which comprises mixing in the presence of an emulsion colloid a solution comprising a barium halide and a solution of the silver salt whose anions forms an insoluble compound with barium.

3. The process of claim 2 in which gelatin is used as the colloid.

4. A process of making photographic silver salt emulsions of the type described which comprises mixing a solution of barium halide with a solution of silver sulfate in the presence of a colloid.

5. A process of forming photographic silver salt emulsions of the type described which comprises mixing a solution comprising barium halide with the solution of silver fluoride in the presence of an organic colloid.

6. A process of forming a silver salt emulsion of the type described which comprises mixing a solution containing a mixture of silver salts, the anion of one of said salts forming an insoluble compound with barium, with a solution of salts comprising barium halide and other halides in the presence of an organic colloid.

In witness whereof, I have hereunto signed my name.

STEFAN FRÄNKEL.